United States Patent [19]

Temme

[11] 4,113,084
[45] Sep. 12, 1978

[54] SCRAPER CHAIN ASSEMBLIES

[75] Inventor: Helmut Temme, Waltrop, Fed. Rep. of Germany

[73] Assignee: Gewerkschaft Eisenhutte Westfalia, Fed. Rep. of Germany

[21] Appl. No.: 769,094

[22] Filed: Feb. 16, 1977

[30] Foreign Application Priority Data

Feb. 28, 1976 [DE] Fed. Rep. of Germany ....... 2608289

[51] Int. Cl.² ............................................. B65G 19/00
[52] U.S. Cl. ..................................... 198/731; 198/728
[58] Field of Search ............... 198/728, 731, 733, 648, 198/712, 734

[56] References Cited

U.S. PATENT DOCUMENTS

| 2,757,784 | 8/1956 | Von Stroh et al. | 198/731 |
| 3,089,579 | 5/1963 | Beck | 198/731 |
| 3,522,875 | 8/1970 | Smerd et al. | 198/728 |
| 3,869,039 | 3/1975 | Temme et al. | 198/734 |

FOREIGN PATENT DOCUMENTS

| 2,359,605 | 11/1974 | Fed. Rep. of Germany | 198/731 |
| 1,090,730 | 11/1967 | United Kingdom | 198/731 |

Primary Examiner—Joseph E. Valenza
Attorney, Agent, or Firm—Thompson, Birch, Gauthier & Samuels

[57] ABSTRACT

A scraper unit for a scraper-chain assembly is composed of a one-piece scraper with extensions at the ends of its main body for engagement with horizontal links of the chains. The extensions have underside recesses which locate the shanks of the horizontal links and external cavities which locate the vertical links joined to these horizontal links. Deep vertical profiled pockets in the scraper end regions receive and shape-lock coupling pieces which encompass the inner shanks of the horizontal links and project laterally across the links, i.e., parallel to the scraper. The coupling pieces can be permanently joined to the links or detachable therefrom. The coupling pieces have tongues which support beneath the outer shanks of the horizontal links. Nuts engage on fixing bolts or the like projecting through both the scraper and the coupling pieces enabling the scraper to be detached. Where the coupling pieces are detachable they have additional threaded pins engaging in bores in the scraper and receiving nuts.

28 Claims, 14 Drawing Figures

SCRAPER CHAIN ASSEMBLIES

BACKGROUND TO THE INVENTION

The present invention relates in general to scraper-chain assemblies for use in scraper-chain conveyors and more particularly to scrapers and scraper units therefor.

Scraper-chain assemblies of various designs are well known in the art. The present invention is particularly but not solely concerned with the so-called double-chain assembly where scrapers are mounted between a pair of widely spaced oval-link chains. In order to connect the scrapers to the chains various forms of connectors can be utilized. In one early simple design open shackles are inserted into the chains at intervals and are secured to the scraper. A more recent design has welded-on extensions to the scraper body which engage over horizontal links of the chains. Additional plates are clamped to these extensions with vertical screws and engage beneath the links. The extensions and the complementary plates can be shaped to co-operate and locate the chain links in grooves or recesses. One example of a scraper assembly of this type is described in German Patent Specification No. 1921747. In another known construction described in German patent specification No. 2105960 welded-on extensions to the scraper body engage beneath the horizontal chain links and open hook-like rings engage over the inner shanks of these links. Connectors then extend across the links from above to engage over the outer shanks and these connectors are secured to the scraper with horizontal screws extending parallel to the scraper. This construction necessitates tilting and other manoeuvring of the components when assembly or disassembly is taking place and it is preferable to employ a more simple vertical connection.

A general object of the present invention is to provide an improved scraper unit design.

SUMMARY OF THE INVENTION

In one aspect the invention provides a scraper unit comprising a scraper with end portions shaped at their undersides to seat onto horizontal chain links of a pair of chains and provided with shaped internal pockets narrower than said end portions, locking elements for securing the scraper to said chain links, said locking elements extending around the inner shanks of said links and being received and supported within said pockets and means securing the scraper to said locking elements. Preferably the end portions or extensions of the scraper are reduced in height relative to the main body of the scraper and are formed integrally with the main body of the scraper. The pockets are deep and mount the locking elements or coupling pieces in a position perpendicular to the chains and generally vertical, aligned centrally to the scraper. The end portions preferably extend right over the horizontal chain links and have grooves receiving and locating the shanks thereof. A scraper unit made in accordance with the invention can produce a highly stable reliable structure of simple design where assembly and disassembly can be effected quite easily.

The locking elements can be flat plates or flat links supported at a plurality of surface contact zones within the pockets of the scraper. The pockets of the scraper may have a height greater than that of the end portions to receive a major part of the elements therein. The pockets may be open from the underside permitting the scraper to be inserted onto the locking elements. Threaded members, such as bolts, can extend through bores in the scraper to engage right through the locking elements. The disposition of the bolts and the pockets co-operate and serve to lock the elements to the scraper and forces are reliably transmitted from the scraper to the chains during use without undue stress occurring in the locking elements.

The locking elements can be coupled to the horizontal chain links in a non-detachable manner and may take the form of a closed shackle resembling the links of the chain. Alternatively, the locking elements may have openings enabling them to be removed from and assembled to the chain links at will. To additionally support the chains, the locking elements may have tongues or the like engaging beneath the outer shanks of the horizontal chain links and the end portions of the scraper may have exterior cavities which receive and mate with the vertical links connected to the horizontal links. The locking elements may provide stops limiting the free displacement of the vertical links necessary to preclude jamming.

In one other constructional form the locking elements are flat plate-like stampings which have bores receiving the chain links. However such a locking element may instead have an opening which enables it to be initially assembled to the chain link and then the element is locked to the link by deformation of a part thereof, e.g., by bending. The deformed part seats in the associated pocket but can be, if necessary, bent back to its original position to enable the link to be removed. In the case where the locking elements have openings, an additional connection between the elements and the scraper can be effected by upstanding spigots or pins of the locking elements engaging in holes or bores in the scraper. Preferably these pins are threaded and receive nuts. The pockets can be shaped to provide stepped wall portions accommodating the opening of the locking elements. In an especially useful design described hereinafter the pockets are designed to accept locking elements of two types one of the type permanently secured to the chain links and the other of the type detachable therefrom.

It is possible to adapt the invention to scraper-chain assemblies with central chains by arranging the pockets and locking elements at the centre rather than at the ends of the scraper. In this case the scraper unit may comprise a scraper with a reduced portion shaped at its underside to seat onto horizontal chain links of a pair of chains and provided with shaped internal pockets narrower than said reduced portions, locking elements for securing the scraper to said chain links, said locking elements extending around the inner shanks of said links and being received and supported within said pockets and means securing the scraper to said locking elements.

As will become apparent the invention also provides a scraper-chain assembly for a conveyor, said assembly consisting of a pair of chains with scraper units mounted therebetween and spaced apart along the chains; each scraper unit being composed of a one-piece scraper, coupling pieces for coupling the scraper to the chains and detachable fixing members for securing the coupling pieces to the scraper, each scraper having a central body, shaped end portions with grooves at their undersides for seating onto both the shanks of horizontal links of the chains, bores extending parallel to the chains for receiving the fixing members and internal shaped pockets for receiving major parts of the coupling pieces therein, wherein the coupling pieces lock around the inner shanks of associated horizontal chain links, project across these links and are received in a generally vertical manner snugly within the pockets of the respective associated scrapers so as to restrict horizontal and vertical movements thereof and wherein the coupling pieces also have tongues projecting beneath and supporting the outer shanks of the associated horizontal chain links.

The invention may be understood more readily and various other features of the invention may become apparent from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

Figures 1, 2:
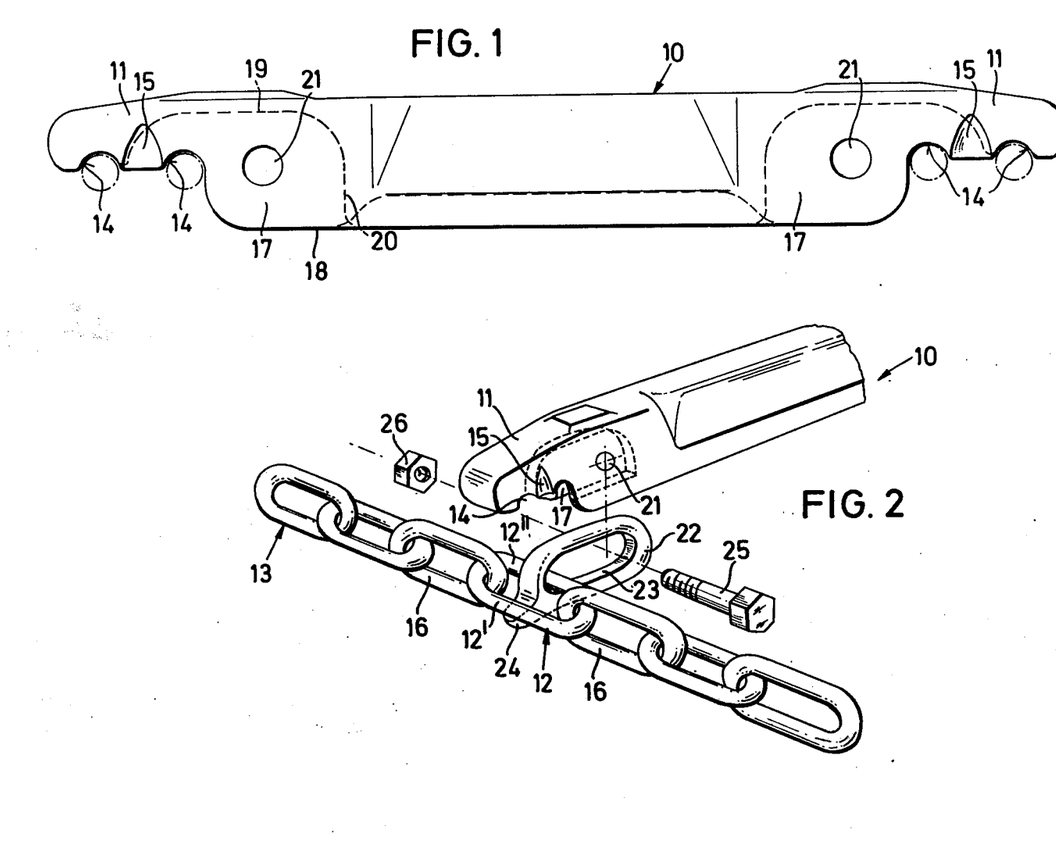
FIG. 1 is an elevation of a scraper made in accordance with the invention.
FIG. 2 is a perspective exploded view of part of a scraper unit including the scraper of FIG. 1.
Figure 3:
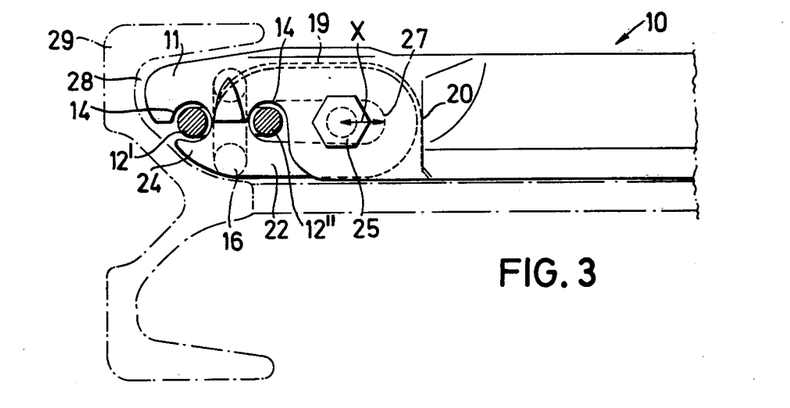
FIG. 3 is an elevation of the part of the assembled scraper unit shown in FIG. 2, the FIG. 3 also depicting an associated conveyor pans.

Referring initially to FIGS. 1 to 5, a scraper unit for a scraper-chain assembly is composed of a scraper 10 and coupling pieces or locking elements 22 for fixing the scraper 10 to a pair of chains 13. For convenience only one chain and one end of the scraper and scraper unit is depicted in the drawings and it is to be understood that the constructions are symmetrical. The scraper 10 is a one-piece construction with shaped end portions 11 adapted to seat onto horizontal links 12 of the chains is represented in FIG. 2. The end portions 11 are each reduced in height in relation to the main central body of the scraper 10 and have a length such that they extend right over the horizontal chain links 12. The width of the end portions 11 is substantially the same as the main central body of the scraper 10 and is somewhat less than the overall length of the chain links 12. At their undersides, the end portions 11 are provided with grooves or recesses 14 approximately semi-circular in shape and serving to receive the shanks 12', 12" (FIG. 2) of the chain links 12. Between the grooves 14 each end portion 11, has external cavities 15 facing outwardly. The cavities 15 serve to receive the vertical links 16 of the chains adjoining the horizontal links 12 with a slight amount of free displacement therefor. At the juncture zones between the main body and the end portions 11, the scraper 10 is provided with internal pockets 17 open at the underside 18 of the scraper 10. These pockets 17 extend vertically in the height sense and partially over the end portions 11 and partially over the adjoining regions of the main body. The pockets 17 are located more or less centrally between the cavities 15 and terminate at upper and inner walls 19, 20 respectively. Bores 21 are provided in the end regions of the main body of the scraper 10 to pierce the pockets 17 and these bores 21 are more or less parallel to the chains. The axes of the bores 21 are located in a common plane with the centres of curvature of the grooves 14 and this common plane extends centrally of the scrapers 10. The locking elements 22 which secure the scraper 10 to the chains and complete the scraper unit of FIGS. 2 to 5 here take the form of closed shackles resembling the chain links. As shown in FIG. 2, the elements 22 are coupled with the horizontal chain links 12 to encompass the inner shanks 12" thereof. The thickness or width of the elements 22 is approximately the same as the pockets 17 which receive the elements 22 as shown particularly in FIG. 5. The height of the pockets 17 is substantially the same as the elements 22 and the walls 19, 20 of the pockets 17 have the same shape or contour as the elements 22 so that there is maximum contact between the exterior of the elements 22 and the defining walls of the pockets 17. The inner surfaces 23 of the elements 22 are preferably flattened as shown in FIG. 2. The elements 22 are provided with projections in the form of tongues or lugs 24 which engage under the outer shanks 12' of the horizontal chain links. As shown in FIG. 3 these projections 24 have a curved profile matching the curvature of the shanks 12.

The locking elements 22 would be mounted in the chains at intervals corresponding to the location of the scrapers 10. To assemble the scrapers 10 the latter are installed from above to receive the elements 22 in their pockets 17 and to seat with their recesses 14 on the shanks 12', 12" of the chain links 12 in question. Fastening members, such as bolts 25, are then inserted through the bores 21 and through the elements 22 and are fitted with nuts 26. The bolts 25 adopt positions displaced at a distance 'x' from the inner boundary 27 of the elements 22, as shown in FIG. 3, and the shaped locking between the pockets 17 and the elements 22 prevents the latter from moving about the axes of the bolts 25. The elements 22 lock in the pockets 17 and their projections 24 cooperate with the outer grooves 14 of the scraper 10 in locking with the outer shanks 12' of the links 12.

Figure 4:
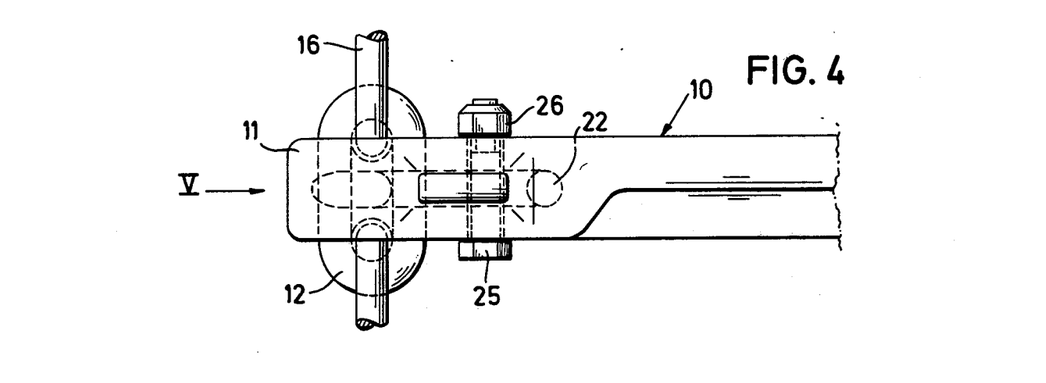
FIG. 4 is a plan view of the part of the assembled scraper unit shown in FIGS. 2 and 3.
Figure 5:
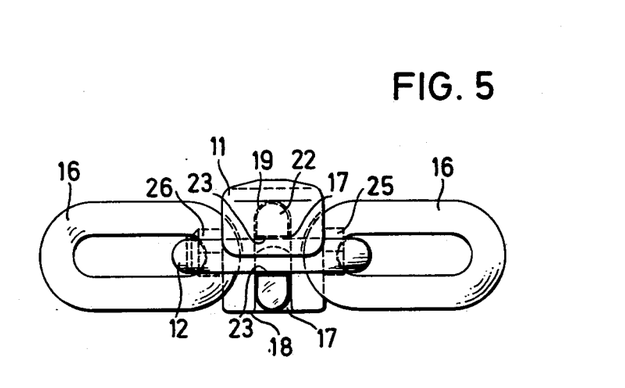
FIG. 5 is an end view of the part of the assembly scraper unit shown in FIGS. 2 and 3, the view being taken in the direction of arrow V of FIG. 4.

FIGS. 3 to 5 show particularly the relationship between the assembled components and in FIG. 3 the associated conveyor channel section or pans along which the scraper-chain assembly is circulated is shown in chain-dotted lines. The external faces of the elements 22 with their projections 24 and of the scraper 10 match that of the guide channels 28 defined by the conveyor side walls 29.

Figure 6:
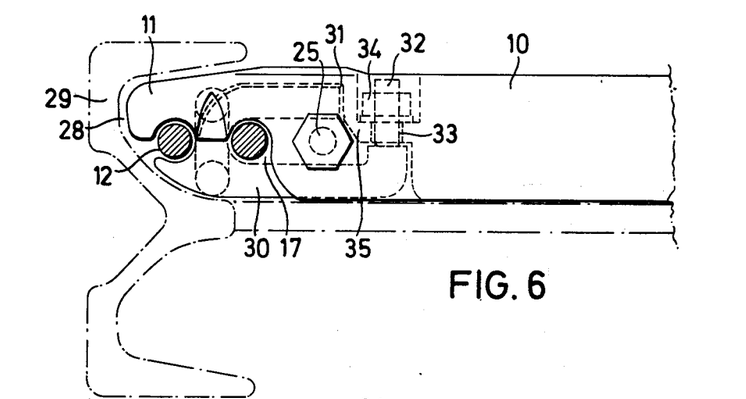
FIG. 6 is an elevation of part of a further form of assembled scraper unit made in accordance with the invention, the view generally corresponding to FIG. 3.
Figure 7:
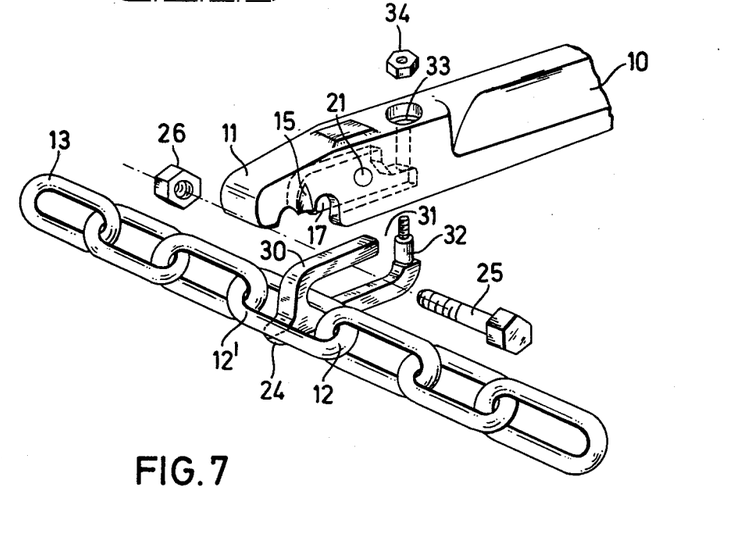
FIG. 7 is a perspective exploded view of the part of the scraper unit shown in FIG. 6, the view generally corresponding to FIG. 2.
Figure 8:
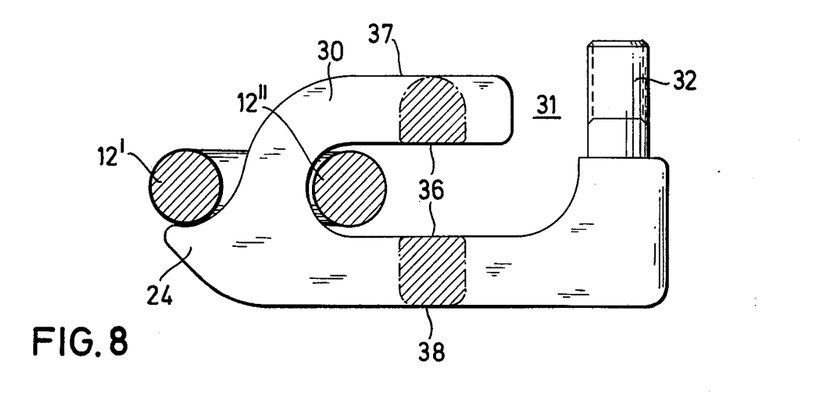
FIG. 8 is an elevation of the locking element of the scraper unit of FIGS. 6 and 7 with the associated chain link view being taken on a somewhat enlarged scale in relation to FIGS. 6 and 7.

The scraper unit depicted in FIGS. 6 to 8 is constructed in a similar manner to that depicted in FIGS. 1 to 5. In contrast to the construction of FIGS. 1 to 5, however, the coupling pieces or locking elements 30 employed in the construction of FIGS. 6 to 8 are not closed and can thus be coupled with and detached from the chain links 12 at will. The requisite opening of each element 30, denoted 31 in FIGS. 6 to 8, is located at the inner region of the upper part thereof remote from the links 12 and an upstanding threaded pin 32 is provided at the inside of the opening 31. The scraper 10 is provided with corresponding holes 33 which receive the pins 32 and nuts 34 engaging in countersunk recesses at the upper side of the scraper 10 locate with the threaded stems of the pins 32. The pockets 17 in the scraper 10 are modified by being shaped with stepped walls as at 35 to provide an opening which meets the holes 33 and locates with the lower end portions of the elements 30 adjoining the pins 32. In this way the pockets 17 and the pins 32 are shaped locked with the elements 30 when the unit is assembled. As shown particularly in FIG. 8, the inner surfaces 36 of the elements 30 are flat. The lower faces 38 of the elements 30 are also flat to form continuations of the lower face of the scraper 10 and the curved profiles 37 at the top of the elements 30 are matched by the upper profiles 19 of the pockets 17. The method of assembly and disassembly of the scraper unit of FIGS. 6 to 8 is much the same as described except for the additional connection between the nuts 34 and the pins 32.

Figure 10:
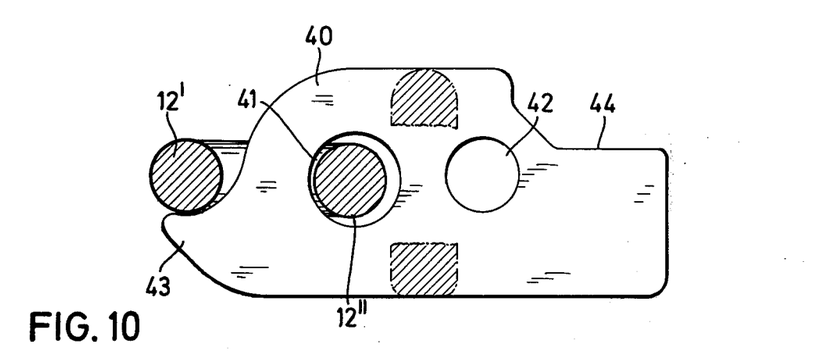
FIG. 10 is an elevation of a further form of locking element which can be used in the scraper units of FIGS. 6 and 9.

FIG. 10 illustrates another type of connection or locking element, denoted 40. Here the element 40 is of flat plate-like form again received in a pocket 17 in the associated scraper 10. The element 40 is provided with an aperture 41 which accommodates the inner shank 12" of the horizontal chain link 12 and is therefore locked thereto.

A further aperture 42 serves to receive the fixing bolt 25 (FIGS. 2 and 7). The element 40 is again formed with a projection 43 engaging beneath the outer shank 12' of the chain link 12. The plate element 40 has a cut-out or recess 44 formed at its upper inner region which mates with the shaped step wall (35 FIGS. 6 and 7) of the pocket 17 in the scraper. The element 40 can thus be used instead of the element 30 in the unit depicted in FIGS. 6 to 8.

Figure 9:
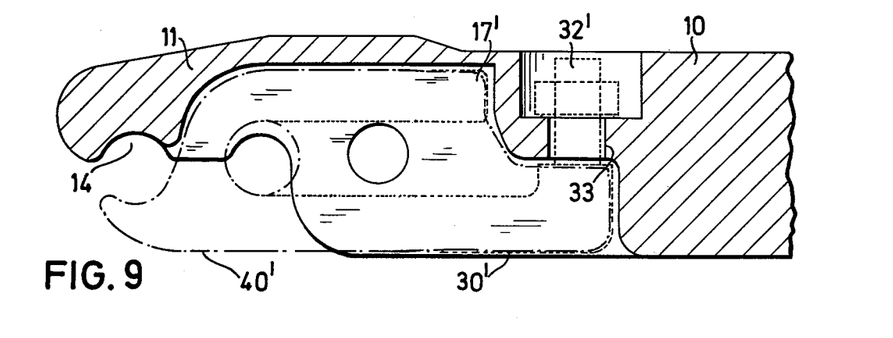
FIG. 9 is a part-sectional elevation of part of a scraper unit made in accordance with the invention and similar to that of FIGS. 6 and 7, the view generally corresponding to FIG. 3 but taken on a somewhat enlarged scale.

FIG. 9 represents another construction for the scraper where the internal pocket 17' is designed in the manner depicted in FIGS. 6 and 7 to accept the connecting element 30 of FIGS. 7 and 8 or the element 40 of FIG. 10. Here, by way of example, the element 30 is, shown in chain dotted lines denoted 30' and the element 40 is shown in chain-dotted lines denoted 40'. When the element 30, is used its threaded pin 32' engages in the corresponding hole 33 of the scraper otherwise the stepped wall accepts the cut-out 44 (FIG. 10) or the opening 31 (FIG. 8) of the elements 40', 30' that is used.

Another form of connecting element is shown in FIGS. 11 to 14. Here, the element, denoted 50, is again received in one of the pockets 17 in the scraper and has a bore for receiving the fixing bolt.

Figure 11:
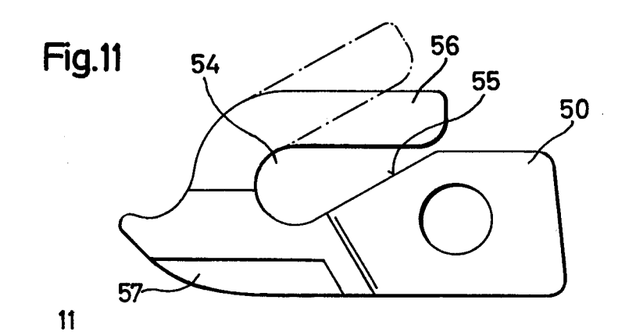
FIG. 11 is a diagrammatic elevation of another form of locking element.
Figure 12:
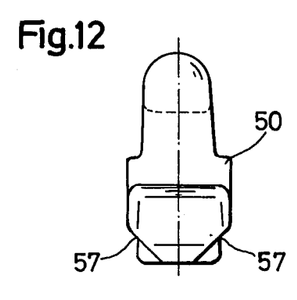
FIG. 12 is an end view of the locking element shown in FIG. 11.
Figure 13:
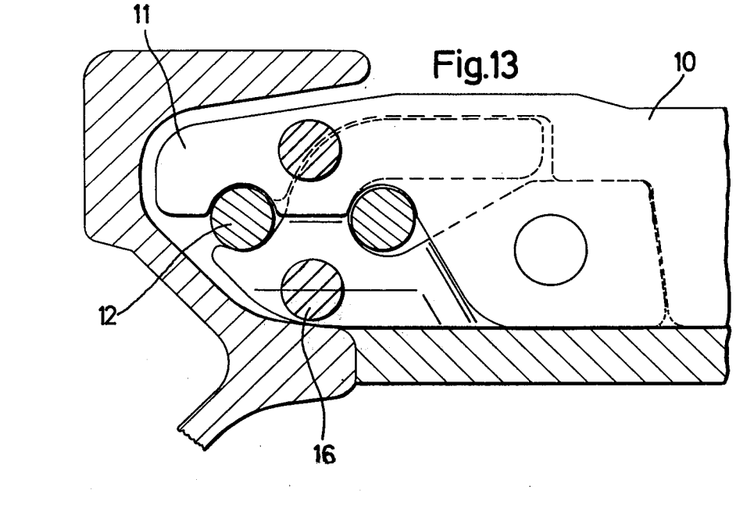
FIG. 13 is a sectional end view of part of a conveyor pan and of part of a scraper unit employing the locking element shown in FIG. 12.
Figure 14:
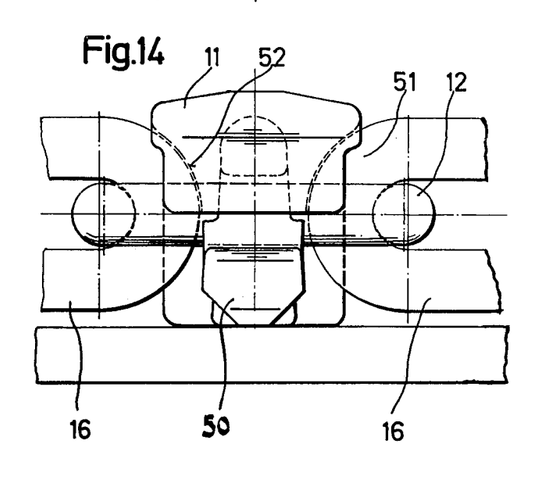
FIG. 14 is an end view of the scraper unit of FIG. 13 with the conveyor side wall omitted.

As shown in FIG. 11, the element 50 is intially fabricated with a slot 54 open at its upper side and an inclined part shown in chain-dotted lines. When installed, the slot 54 receives the inner shank 12" of the horizontal chain link 12 and the element 50 is then locked to the link 12 by deforming or bending the inclined part inwardly to adopt the full line position designated 56 in FIG. 11. FIG. 13 shows the element 50 coupled to the chain link 12 and fitted into the scraper 10. The element 50 again has the tongue or projection engaging beneath the outer shank of the chain link 12. The element 50 is shaped together with the end portion 11 of the associated scraper 10 to conform with the guide channel of the conveyor pan as shown in FIG. 13. The lower external region of the element 50 has bevelled surfaces 57, as shown in FIGS. 11 and 12, which facilitates the passage of the scraper-chain assembly over the sprockets at the ends of the conveyor. FIG. 14 shows the guide surfaces 52 of the cavities in the end portions 11 of the scraper 10 which can contact the arcuate portions 51 of the vertical chain links 16 joining the horizontal link 12. The element 50 has corner faces closely adjacent the links 16 to form stops therefor. The links 16 thus have a certain limited freedom of movement precluding jamming.

I claim:

1. In or for a scraper-chain assembly for a mine conveyor; a scraper unit comprising: a scraper with end portions shaped at their undersides to seat onto horizontal chain links of a pair of chains and provided with shaped internal pockets narrower than said end portions; locking elements for securing the scraper to said chain links; and means securing the scraper to said locking elements wherein said locking elements extend around the inner shanks of said links and are received and supported within said pockets and the pockets overlap the inner shanks of the chain links and have internal walls which engage with the locking elements to restrict lateral movement in both directions across the chain links and vertical movement above the chain links.

2. A scraper unit according to claim 1, wherein the end portions of the scraper extend over both shanks of the chain links and have grooves at their undersides receiving said shanks.

3. A scraper unit according to claim 1, wherein the pockets are open to the underside of the scraper and are vertically orientated and a major portion of each of the locking elements extends into its associated pocket to adopt a position aligned with the longitudinal axis of the scraper.

4. A scraper unit according to claim 1 wherein the means securing the scraper to the locking elements includes threaded members which extend through bores in the scraper and pass through the locking elements.

5. A scraper unit according to claim 4, wherein the pockets are so shaped and the threaded members are so disposed as to secure the locking elements against displacement in the pockets.

6. A scraper unit according to claim 1, wherein the end portions of the scraper have exterior cavities which are shaped to receive arcuate portions of the vertical links of the chains adjoining said horizontal links.

7. A scraper unit according to claim 6, wherein the locking elements also provide stops for limiting the free displacement of said vertical links.

8. A scraper unit according to claim 1, wherein the locking elements are provided with lateral projections which engage beneath the outer shanks of the horizontal chain links.

9. A scraper unit according to claim 2, wherein the locking elements have projections which cooperate with some of the grooves in the end portions of the scraper in engaging around the outer shanks of the horizontal chain links.

10. A scraper unit according to claim 1, wherein the scraper is of one piece integral construction.

11. A scraper unit according to claim 1, wherein the locking elements are in the form of closed shackles non-detachably coupled to the horizontal links.

12. A scraper unit according to claim 1, wherein the locking elements are in the form of flat plates with bores receiving the horizontal links in a nondetachable manner.

13. A scraper unit according to claim 1, wherein the locking elements have openings enabling them to be detached from and assembled to the horizontal links.

14. A scraper unit according to claim 1, wherein the locking elements are initially formed with openings permitting their assembly to the horizontal links and therafter the elements are locked to the links in a non-detachable manner by deformation of portions thereof.

15. A scraper unit according to claim 1, wherein the flat plates have further bores for receiving threaded members which also extend through bores in the scraper the threaded members constituting said securing means.

16. A scraper unit according to claim 13, wherein the locking elements have pins adjacent their openings and the scraper has bores for receiving said pins; the pins and bores serving to secure the scraper to the locking elements.

17. A scraper unit according to claim 16, wherein the pins are threaded to receive nuts.

18. A scraper unit according to claim 16 wherein the openings and pins of the locking elements are located opposite and remotely from the portions of the locking elements engaging around the inner shanks of the horizontal chain links.

19. A scraper unit according to claim 18, wherein the pockets have stepped wall portions accommodating the parts of the locking elements defining the openings thereof and the pockets communicate with the bores for receiving the pins.

20. A scraper unit according to claim 1, wherein the pockets are shaped to receive either first or second types of locking elements, the first and second types of locking elements being of similar shape but of different functional form, the first type of locking element being provided with openings permitting removal from the horizontal links and the second type of locking element being closed and non-detachably coupled with the horizontal links.

21. In or for a scraper-chain assembly for a mine conveyor; a scraper unit comprising: a scraper with end portions shaped at their undersides to seat onto horizontal chain links of a pair of chains and provided with shaped internal pockets narrower than said end portions; locking elements for securing the scraper to said chain links; and means securing the scraper to said locking elements wherein said locking elements extend around the inner shanks of said links and are received and supported within said pockets and wherein the pockets overlap the inner shanks of the chain links and are shaped to receive either first or second types of said locking elements, the first and second types of locking elements being of similar shape but of different functional form with the first type of locking elements being provided with openings permitting removal of said first type of elements from the links and the second type of locking elements being closed and non-detachably coupled with the links.

22. A scraper unit according to claim 21, wherein the pockets have stepped wall portions for accommodating the parts of of the first type of locking elements defining the opening thereof and correspondingly located shaped cut-out portions of the second type of locking elements.

23. A scraper unit according to claim 22, wherein the pockets adjoin holes in the scraper which can receive pins provided adjacent the openings of the first type of elements with the pins and holes serving as the securing means for securing the scraper to the locking elements.

24. A scraper-chain assembly for a conveyor, said assembly consisting of a pair of chains with scraper units mounted therebetween and spaced apart along the chains; each scraper unit being composed of a one-piece scraper, coupling pieces for coupling the scraper to the chains and detachable fixing members for securing the coupling pieces to the scraper, each scraper having a central body, shaped end portions with grooves at their undersides for seating onto both the shanks of horizontal links of the chains, bores extending parallel to the chains for receiving the fixing members and internal shaped pockets which overlap the inner shanks of the chain links for receiving major parts of the coupling pieces therein, wherein the coupling pieces lock around the inner shanks of associated horizontal chain links, project across these links and are received in a generally vertical manner snugly within the pockets of the respective associated scraper so as to restrict both horizontal and vertical movements thereof and wherein the coupling pieces also have tongues projecting beneath and supporting the outer shanks of the associated horizontal chain links.

25. An assembly according to claim 24, wherein the coupling pieces are non-detachably linked to the associated horizontal chain links.

26. An assembly according to claim 24, wherein the coupling pieces are detachable from the associated horizontal chain links via openings and additional fixing means between the scrapers and the coupling piece is effected by pins of the coupling pieces engaging in holes in the scrapers.

27. In or for a scraper-chain assembly for a mine conveyor; a scraper unit comprising: a scraper with end portions shaped at their undersides to seat onto horizontal chain links of a pair of chains and provided with shaped internal pockets narrower than said end portions; locking elements for securing the scraper to the chain links, said locking elements being in the form of closed shackles non-detachably coupled to the horizontal links to engage around the inner shanks of said links and being received and supported within said pockets; and means for securing the scraper to said locking elements.

28. In or for a scraper-chain assembly for a mine conveyor; a scraper unit comprising: a scraper with end portions shaped at their undersides to seat onto horizontal chain links of a pair of chains and provided with shaped internal pockets narrower than said end portions; locking elements for securing the scraper to the chain links, said locking elements being in the form of flat plates non-detachably coupled to the horizontal links, said plates having bores receiving the inner shanks of said links and being received and supported within the pockets; and means for securing the scraper to said locking elements.

* * * * *

UNITED STATES PATENT AND TRADEMARK OFFICE
CERTIFICATE OF CORRECTION

PATENT NO. : 4,113,084
DATED : September 12, 1978
INVENTOR(S) : Helmut Temme

It is certified that error appears in the above—identified patent and that said Letters Patent are hereby corrected as shown below:

Col. 7, line 27 - "claim 1" should be --claim 12--.

Signed and Sealed this

Thirteenth Day of November 1979

[SEAL]

Attest:

RUTH C. MASON
Attesting Officer

LUTRELLE F. PARKER
Acting Commissioner of Patents and Trademarks